United States Patent
Sekiya et al.

(10) Patent No.: US 10,186,692 B2
(45) Date of Patent: Jan. 22, 2019

(54) ELECTRICAL STORAGE DEVICE

(71) Applicant: HITACHI CHEMICAL COMPANY, LTD., Tokyo (JP)

(72) Inventors: Masaaki Sekiya, Tokyo (JP); Atsushi Sakurai, Tokyo (JP); Noritaka Eguchi, Tokyo (JP); Takafumi Masui, Tokyo (JP); Yoshimi Wakamatsu, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 131 days.

(21) Appl. No.: 15/108,044

(22) PCT Filed: Dec. 22, 2014

(86) PCT No.: PCT/JP2014/083956
§ 371 (c)(1),
(2) Date: Jun. 24, 2016

(87) PCT Pub. No.: WO2015/098866
PCT Pub. Date: Jul. 2, 2015

(65) Prior Publication Data
US 2016/0343997 A1    Nov. 24, 2016

(30) Foreign Application Priority Data

Dec. 26, 2013  (JP) .................. 2013-270463

(51) Int. Cl.
*H01M 2/02* (2006.01)
*H01M 2/04* (2006.01)
(Continued)

(52) U.S. Cl.
CPC ............ *H01M 2/022* (2013.01); *H01G 11/06* (2013.01); *H01G 11/24* (2013.01); *H01G 11/52* (2013.01);
(Continued)

(58) Field of Classification Search
CPC ........ H01G 11/74; H01G 11/80; H01G 11/06; H01G 11/70; H01G 11/52; H01G 11/24;
(Continued)

(56) References Cited

U.S. PATENT DOCUMENTS

| 2013/0163147 A1* | 6/2013 | Uehara | ................. H01G 11/06 |
| | | | 361/502 |
| 2013/0224546 A1 | 8/2013 | Hama et al. | |
| 2014/0087226 A1* | 3/2014 | Mishiro | ................. H01M 2/30 |
| | | | 429/94 |

FOREIGN PATENT DOCUMENTS

| CN | 2710180 Y | 7/2005 |
| CN | 103119675 A | 5/2013 |

(Continued)

OTHER PUBLICATIONS

International Search Report for PCT/JP2014/083956 dated Apr. 7, 2015; English translation submitted herewith (5 Pages).

(Continued)

*Primary Examiner* — Muhammad S Siddiquee
(74) *Attorney, Agent, or Firm* — Fitch, Even, Tabin & Flannery, L.L.P.

(57) ABSTRACT

Provided herein is an electrical storage device that can reduce fluctuations in pressing force applied to different portions of an insulating ring member. Eight projections 19c are integrally provided on a surface of a plate-like portion 19b of an insulating ring member 19, which opposes an annular projected portion 15, to contact the annular projected portion 15. The projections 19c are disposed at constant intervals in the circumferential direction of an axial core 11. The projections 19c are each shaped to extend in the radial direction of the axial core 11, and each have a length to project inwardly of a top portion 15a of the annular (Continued)

projected portion 15 in the radial direction of the axial core 11, being in contact with the annular projected portion 15.

4 Claims, 6 Drawing Sheets

(51) Int. Cl.

| | |
|---|---|
| *H01M 2/12* | (2006.01) |
| *H01G 11/70* | (2013.01) |
| *H01G 11/74* | (2013.01) |
| *H01G 11/80* | (2013.01) |
| *H01M 2/22* | (2006.01) |
| *H01M 2/34* | (2006.01) |
| *H01G 11/06* | (2013.01) |
| *H01G 11/24* | (2013.01) |
| *H01G 11/52* | (2013.01) |
| *H01M 10/04* | (2006.01) |
| *H01M 10/0525* | (2010.01) |

(52) U.S. Cl.
CPC ............ *H01G 11/70* (2013.01); *H01G 11/74* (2013.01); *H01G 11/80* (2013.01); *H01M 2/0277* (2013.01); *H01M 2/0285* (2013.01); *H01M 2/0404* (2013.01); *H01M 2/0486* (2013.01); *H01M 2/12* (2013.01); *H01M 2/22* (2013.01); *H01M 2/34* (2013.01); *H01M 10/0431* (2013.01); *H01M 10/0525* (2013.01); *H01M 2220/20* (2013.01); *Y02E 60/13* (2013.01); *Y02T 10/7022* (2013.01)

(58) Field of Classification Search
CPC ...... H01M 2/22; H01M 2/34; H01M 10/0431; H01M 2/12; H01M 2/0486; H01M 2/0404; H01M 2/0285; H01M 2/022; H01M 10/0525; H01M 2/0277; H01M 2220/20; Y02T 10/7022; Y02E 60/13
See application file for complete search history.

(56) References Cited

FOREIGN PATENT DOCUMENTS

| | | |
|---|---|---|
| JP | 11-283588 A | 10/1999 |
| JP | 2000-357495 A | 12/2000 |
| JP | 2009-302019 A | 12/2009 |
| WO | 2012/036249 A1 | 3/2012 |
| WO | 2012/039497 A1 | 3/2012 |

OTHER PUBLICATIONS

Office Action of CN Appln. No. 201480070825.9 dated Nov. 24, 2017 with English translation.

* cited by examiner

ELECTRICAL STORAGE DEVICE

CROSS-REFERENCE TO RELATED APPLICATIONS

This application is a U.S. national phase application filed under 35 U.S.C. § 371 of International Application No. PCT/JP2014/083956, filed Dec. 22, 2014, designating the United States, which claims priority from Japanese Application No. 2013-270463 filed Dec. 26, 2013, which are hereby incorporated herein by reference in their entirety for all purposes.

TECHNICAL FIELD

The present invention relates to an electrical storage device such as a lithium ion capacitor and a lithium ion battery.

BACKGROUND ART

Electrical storage devices such as lithium ion capacitors and lithium ion batteries advantageously have a high energy density, a low self-discharge rate, and good cycle performance. Therefore, in recent years, such storage devices have been expected to be used as a power source for automobiles such as hybrid vehicles and electric vehicles by increasing the size or the capacity of the storage devices. Some examples of the electrical storage devices used as power sources for automobiles are of a wound type in which a wound electrode group formed by winding positive and negative electrodes via a separator about an axial core is contained in a bottomed cylindrical container together with an electrolyte.

In the conventional electrical storage devices of this type, an insulating ring member is attached to the outer peripheral edge of the current collecting member on the side of a lid member for electrical insulation between a current collecting member and the container. Drawing is performed on a peripheral wall of the container at a location above the insulating ring member to form an annular projected portion such that an electrode group unit is fixed in the container by the annular projected portion and the insulating ring member (Patent Document 1).

RELATED-ART DOCUMENT

Patent Document

Patent Document 1: WO 2012/039497 A

SUMMARY OF INVENTION

Technical Problem

With the insulating ring member disclosed in Patent Document 1, however, a pressing force applied to the insulating ring member varies at different locations of the insulating ring member when forming the annular projected portion in the container, thereby deforming the wound electrode group. If the wound electrode group is deformed, not only the battery performance is affected, as a matter of course, but also the wound electrode group may be vibrated in the axial direction of the axial core when vibration is applied to the electrode group in the axial direction, which may cause separation of an active material or separation of the welded portions.

An object of the present invention is to provide an electrical storage device that can reduce fluctuations in pressing force applied to different portions of an insulating ring member.

Solution to Problem

The present invention is aimed at improving an electrical storage device as described below. In one aspect of the present invention, the electrical storage device is provided and includes a wound electrode group, an electrically conductive bottomed cylindrical container, an electrically conductive lid member, a first current collecting member, a second current collecting member, an annular projected portion, and an insulating ring member. The wound electrode group is formed by winding a stacked member around a cylindrical axial core. The stacked member is formed by stacking an electrode having one of positive and negative polarities and formed of an elongated current collector having an active material layer formed thereon such that a welded portion is left on one width-direction end of the electrode having the other of the polarities, a separator, and an electrode having the other of the polarities and formed of an elongated current collector having an active material layer formed thereon such that a welded portion is left on the other width-direction end of the electrode. The container has an opening portion at one end thereof, and is configured to house the wound electrode group therein. The lid member is electrically insulated from the container, and configured to block the opening portion of the container. The first current collecting member is supported by one end of the axial core, and welded to the welded portion of the electrode having the one of the polarities and included in the wound electrode group. The second current collecting member is supported by the other end of the axial core, and welded to the welded portion of the electrode having the other of the polarities and included in the wound electrode group. The annular projected portion is formed by deforming a peripheral wall portion of a peripheral wall of the container to be projected inward in a radial direction of the axial core. The peripheral wall portion is more adjacent to the lid member than to the second current collecting member. The insulating ring member is disposed between the annular projected portion and the second current collecting member to electrically insulate the second current collecting member and the container from each other. The first current collecting member is electrically connected to the container. The second current collecting member is electrically connected to the lid member. In the present invention, the insulating ring member includes a cylindrical portion and a plate-like portion. The cylindrical portion surrounds an outer periphery of an end portion of the wound electrode group on a side of the second current collecting member. The plate-like portion is integrally formed with the cylindrical portion, and extends inward in the radial direction from the cylindrical portion to contact the second current collecting member. A plurality of projections are integrally provided on a surface of the plate-like portion, which opposes the annular projected portion, to contact the annular projected portion. The plurality of projections are disposed at constant intervals in a circumferential direction of the axial core. If such a plurality of projections are provided, a pressing force is intensely applied to the plurality of projections when the container is subjected to drawing to form the annular projected portion. Therefore, fluctuations in pressing force applied to different portions of the insulating ring member are reduced. As a result, it is possible to suppress deformation of the wound electrode group, and to prevent the wound electrode group from vibrating in the axial direction of the axial core when vibration is applied to the electrode group in the axial direction.

The plurality of projections may be each shaped to extend in the radial direction of the axial core. In this case, preferably, the plurality of projections each have a length to project inwardly of the annular projected portion in the radial direction, being in contact with the annular projected portion. Consequently, fluctuations in pressing force transmitted via the projections can be reduced by lowering fluctuations in area over which each projection contacts the annular projected portion.

Preferably, the plurality of projections include three or more projections. With three or more projections, the pressing forces applied to different portions of the insulating ring member via the projections will become uniform.

Preferably, a plurality of through holes for gas discharge are formed in the second current collecting member, and the plate-like portion of the insulating ring member is sized not to block the plurality of through holes. With this configuration, gas discharge can be facilitated, thereby enabling smooth pouring of an electrolyte.

A fixing ring member made of an insulating material and configured to fix the first current collecting member may be provided between a bottom portion of the container and the first current collecting member. The fixing ring member includes a cylindrical portion and a plate-like portion. The cylindrical portion surrounds an outer periphery of an end portion of the wound electrode group on a side of the first current collecting member. The plate-like portion is integrally formed with the cylindrical portion, and extends inward in the radial direction from the cylindrical portion to contact the first current collecting member. A plurality of projections are integrally provided on a surface of the plate-like portion, which opposes the bottom portion, to contact the bottom portion. The plurality of projections are disposed at predetermined (constant) intervals in a circumferential direction of the axial core. With such a configuration, the electrode group unit is fixed on the bottom portion side in the container at an increased number of locations. Therefore, the electrical storage device is more resistant to vibration in the vertical direction.

In another aspect of the present invention, an insulating ring member for an electrical storage device is provided and configured to be fitted with a current collecting member having one of positive and negative polarities and welded to a wound electrode group to electrically insulate the current collecting member and a container from each other. The insulating ring member includes a cylindrical portion and a plate-like portion. The cylindrical portion surrounds an outer periphery of an end portion of the wound electrode group on a side of the current collecting member. The plate-like portion is integrally formed with the cylindrical portion, and extends inward in a radial direction of the cylindrical portion from the cylindrical portion to contact the current collecting member. A plurality of projections are integrally provided on a surface of the plate-like portion that does not oppose the wound electrode group. The plurality of projections are disposed at constant intervals in a circumferential direction of the cylindrical portion.

DESCRIPTION OF EMBODIMENTS

Now, an embodiment in which the present invention is applied to a cylindrical lithium ion capacitor, which is one type of an electrical storage device, will be described below with reference to the drawings.

Configuration of Embodiment

Figure 1:
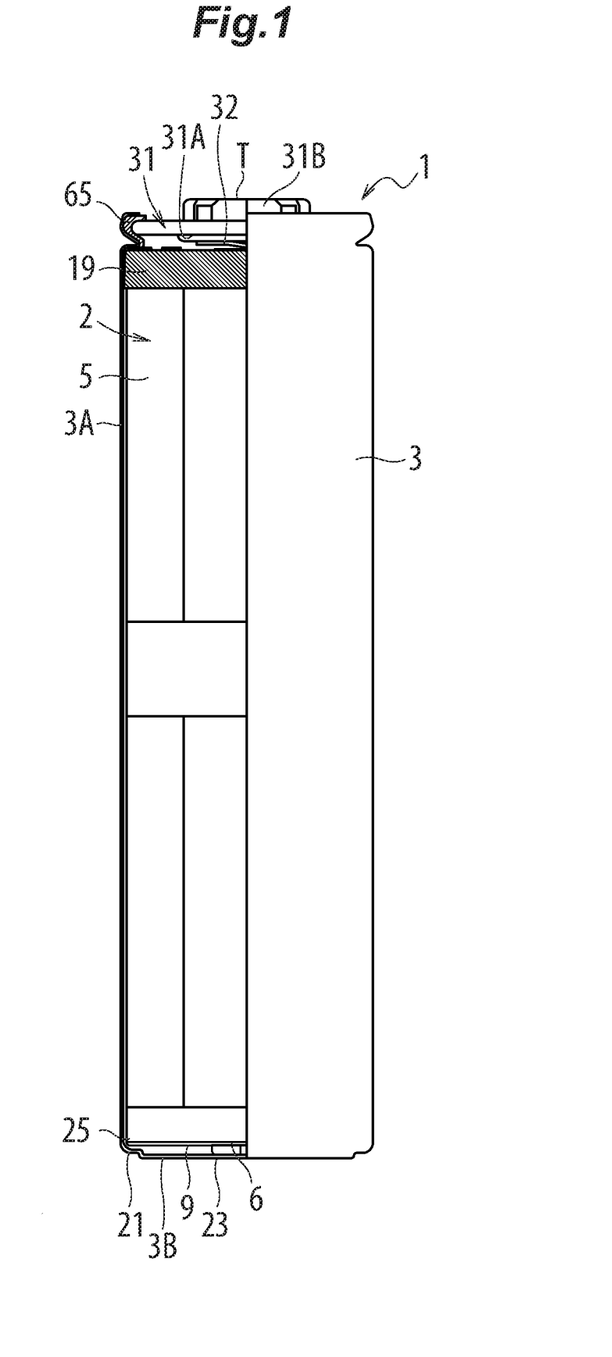
FIG. 1 is a half sectional view schematically illustrating an example cylindrical lithium ion capacitor of one type of electrical storage device, half in section, according to an embodiment of the present invention.
Figure 2:
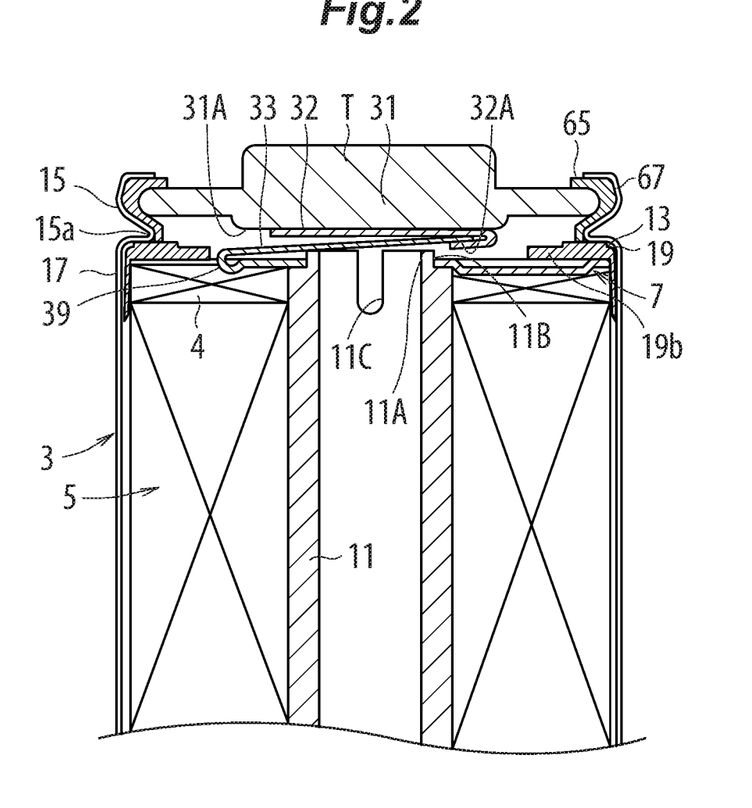
FIG. 2 is an enlarged sectional view illustrating a positive electrode side of the electrical storage device according to the embodiment of the present invention.

<Overall Configuration>
FIG. 1 is a half sectional view schematically illustrating a cylindrical lithium ion capacitor 1 (hereinafter referred to simply as "capacitor 1") according to the present embodiment of the present invention. For illustrating purpose, the capacitor 1 is halved in section with a positive electrode terminal T facing up. FIG. 2 is an enlarged sectional view illustrating a positive electrode side of the capacitor according to the embodiment of the present invention. In FIG. 2, the sectional shape of a wound electrode group 5 is not illustrated; and the internal structure of a lid member 31 is also not illustrated. The capacitor 1 includes a container 3 made of steel plated with nickel and shaped in a bottomed cylinder. The container 3 includes a peripheral wall 3A and a bottom wall 3B. An annular projected portion 15 is provided at a peripheral wall portion of the peripheral wall 3A located on the lid member 31 side with respect to a positive current collecting member (second current collecting member) 7. The annular projected portion 15 is formed by being deformed to project toward an axial core 11 in the radial direction of the axial core 11 as discussed later. An electrode group unit 2 is contained in the container 3. The electrode group unit 2 is constituted from a combination of the wound electrode group 5, the positive current collecting member 7, and a negative current collecting member (first current collecting member) 9. The wound electrode group 5 is constituted by winding an elongated positive electrode and an elongated negative electrode around the hollow cylindrical axial core 11, which is made of polyphenylene sulfide (PPS), via a separator.

The positive electrode of the wound electrode group 5 is formed of an elongated current collector having a positive active material layer formed thereon such that a welded portion is left on one width-direction end of the electrode. Similarly, the negative electrode is formed of an elongated current collector having a negative active material layer formed thereon such that a welded portion is left on the other width-direction end of the electrode. The wound electrode group 5 is constituted by winding a stacked member, which is formed by stacking the positive electrode and the negative electrode via the separator, around the axial core 11 such that a welded portion 4 [see FIG. 2] of the positive electrode and a welded portion 6 [see FIG. 1] of the negative electrode are located at respective end portions of the wound electrode group 5. Porous base material such as kraft paper may be used as the separator.

As illustrated in FIG. 2, an outer periphery 13 of the positive current collecting member 7 is shaped and sized to extend to a position beyond a top portion 15a of the annular projected portion 15. A plate-like portion 19b of an insulating ring member 19, which will be described in detail later, is disposed in a compressed state between the positive current collecting member 7 and the annular projected portion 15, and between the positive current collecting member 7 and an annular wall portion 17 of the peripheral wall 3A which is continuous with the annular projected portion 15. In the embodiment, the positive current collecting member 7 and the insulating ring member 19 constitute fixing means.

As illustrated in FIG. 1, the bottom wall 3B of the container 3 includes an annular bottom wall portion 21 and a protruded portion 23 to enhance the strength of the container 3. The negative current collecting member 9 is shaped and sized such that an outer periphery 25 is located on the side of the peripheral wall 3A of the container 3 with respect to the inner edge portion of the annular bottom wall portion 21.

<Positive Current Collecting Member>

Figure 3A:
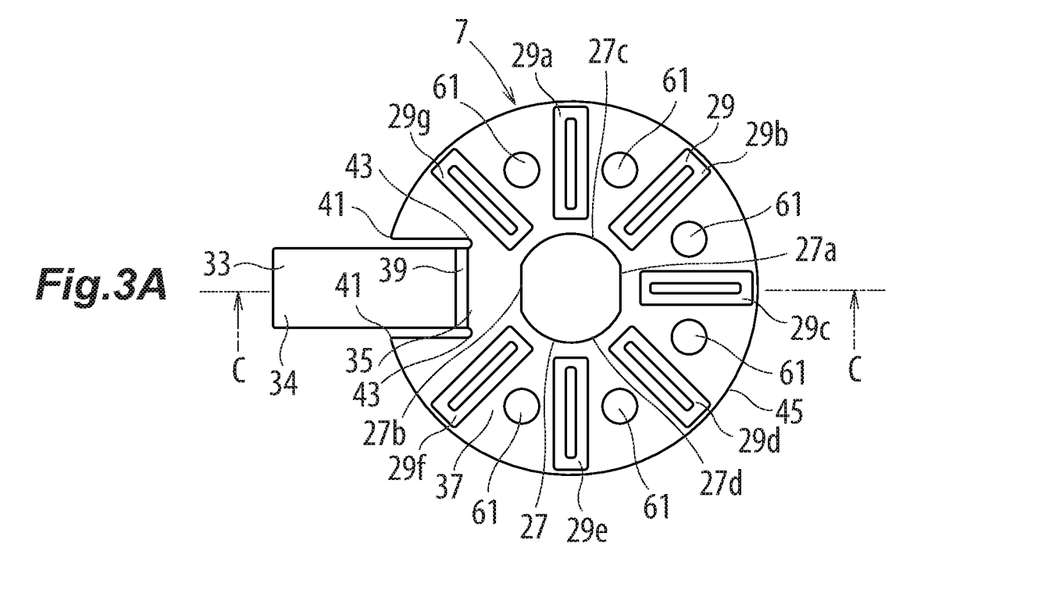
FIG. 3A is a plan view of a positive current collecting member used in the embodiment of the present invention.
Figure 3B:
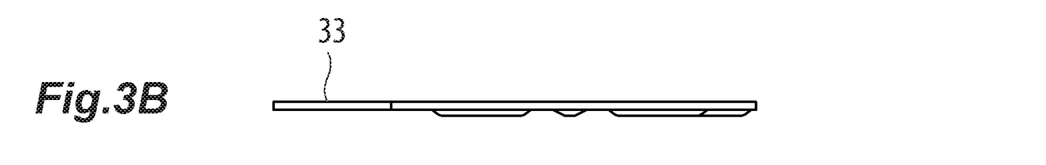
FIG. 3B is a front view of the positive current collecting member.
Figure 3C:
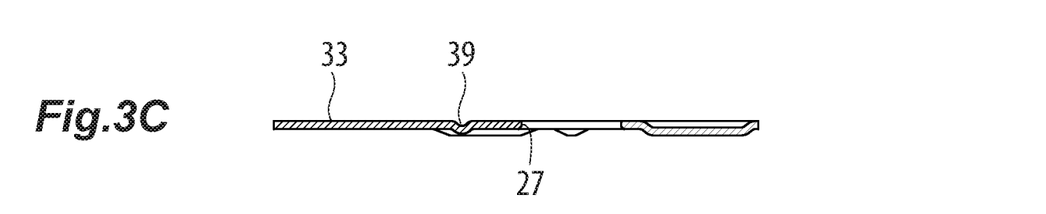
FIG. 3C is a sectional view taken along line C-C of FIG. 3A.

FIG. 3A is a plan view of the positive current collecting member 7. FIG. 3B is a front view of the positive current collecting member 7. FIG. 3C is a sectional view taken along line C-C of FIG. 3A. The positive current collecting member 7 includes: a through hole 27 to be fitted with an end portion 11A [see FIG. 2] of the axial core 11; a positive current collecting member body 37 that constitutes a welding portion located on the outer side of the through hole 27 and extending outward in the radial direction of the axial core 11 to be welded to the welded portion 4 [see FIG. 2] of the positive electrode; and a tab 33 having two ends, one of the two ends being integrally provided with the positive current collecting member body 37 and the other of the two ends being electrically connected to the lid member 31. The positive current collecting member 7 is formed by pressing an aluminum (including an aluminum alloy) plate, and includes the positive current collecting member body 37 which has a ring shape in which the through hole 27 is formed in the center portion as illustrated in FIG. 3A. As illustrated in FIG. 3A, the through hole 27 is shaped to be fitted with the end portion 11A of the axial core 11 to prevent displacement of the positive current collecting member 7 from the center of the wound electrode group 5. The profile of the through hole 27 is defined by being surrounded by a pair of parallel straight edge portions 27a and 27b and a pair of arcuate edge portions 27c and 27d connecting both ends of the straight edge portions 27a and 27b. The profile of a stepped portion 11B formed at the end portion 11A of the axial core 11 is analogous to the shape of the through hole 27. A pair of recessed portions 11C are formed at the end portion 11A of the axial core 11 at locations at which the recessed portions 11C oppose the pair of arcuate edge portions 27c and 27d. Forming the through hole 27 and the end portion 11A of the axial core 11 in such a shape facilitates positioning during insertion of the end portion 11A of the axial core 11 into the through hole 27.

For welding the positive current collecting member 7 and the welded portion 4, the positive current collecting member 7 is first opposed to the welded portion 4 located on the one end of the positive electrode included in the wound electrode group 5, and is then moved toward the wound electrode group 5, and is finally placed on the welded portion 4. Thus, the welded portion 4 of the positive electrode and the positive current collecting member 7 are welded to each other by laser welding as discussed later. For laser welding, the positive current collecting member 7 is provided with seven grooves 29a to 29g that project toward the wound electrode group 5 and that are open in the direction away from the wound electrode group 5. In the embodiment, the grooves 29a to 29g constitute an elongated projecting portion for welding. The seven grooves 29a to 29g are radially formed at intervals in the circumferential direction about the through hole 27. The grooves 29a to 29g have an equal length. In the embodiment, the grooves 29a to 29g are formed such that two adjacent grooves 29 are formed at equal intervals in the circumferential direction with respect to the groove 29c, which is formed at a position opposite to the tab 33 across the through hole 27.

The grooves 29a to 29g are formed between the through hole 27 and an outer periphery or a peripheral portion 45 of the positive current collecting member body 37 (welding portion) located on the outer side of the through hole 27 to be welded to the welded portion 4 of the positive electrode. In the embodiment, the grooves 29a to 29g are terminated before the outermost periphery of the positive current collecting member body 37. With this configuration, welding beads do not project beyond the outermost periphery of the positive current collecting member body 37, thereby preventing unnecessary short-circuiting due to projected welding beads.

One end 34 of the tab 33 is electrically connected to the lid member 31 and the other end 35 of the tab is integrally provided with the positive current collecting member body 37. One elongated projection 39 is formed in the vicinity of the other end 35 of the tab 33 to extend in the width direction of the tab 33, project toward the wound electrode group 5, and open toward the lid member 31. Further, the positive current collecting member body 37 includes two recessed portions 41 that extend from the outermost periphery of the positive current collecting member body 37 toward the through hole 27 and penetrate the positive current collecting member body 37 in the thickness direction. The one end 35 of the tab 33 is integrally formed with bottom portions 43 of the recessed portions 41. Providing such an elongated projection 39 allows the tab 33 to be easily bent along the elongated projection 39 when the tab 33 is bent toward the lid member 31 as illustrated in FIG. 6B. As a result, mechanical strength at the boundary portion between the positive current collecting member body 37 and the tab 33 can be prevented from decreasing, thereby preventing a crack from being caused at the boundary portion. Providing the two recessed portions 41 on both sides to the tab 33 can substantially increase the length of the tab 33. This facilitates welding between the lid member 31 and the tab 33.

Circular gas discharge holes 61 are formed in the positive current collecting member body 37 at positions between the adjacent grooves 29.

<Negative Current Collecting Member>

Figure 4A:
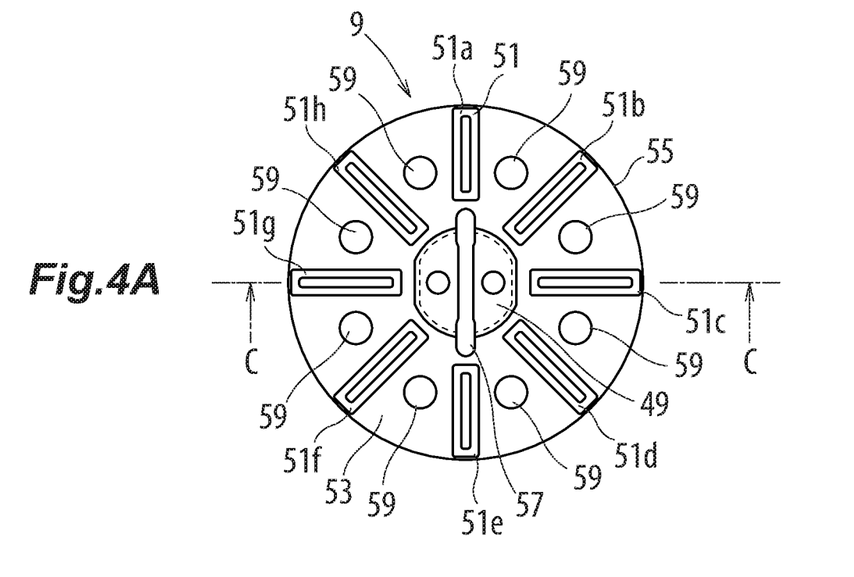
FIG. 4A is a plan view of a negative current collecting member used in the embodiment of the present invention.
Figure 4B:
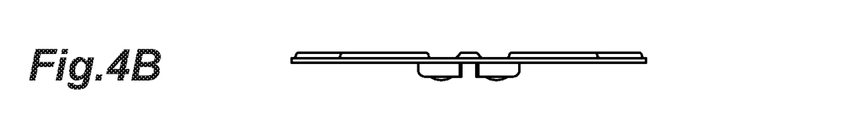
FIG. 4B is a side view of the negative current collecting member.
Figure 4C:
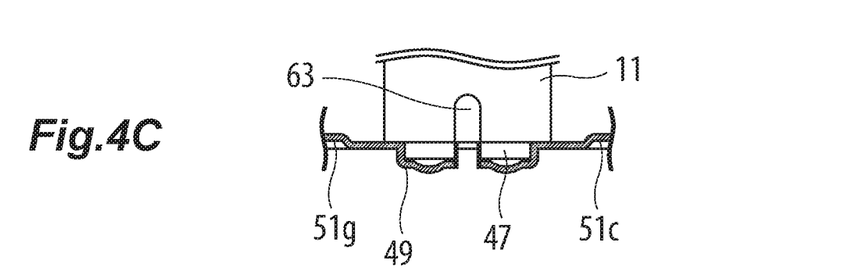
FIG. 4C is a sectional view illustrating that an axial core and the negative current collecting member are fitted with each other.

FIG. 4A is a plan view of the negative current collecting member 9. FIG. 4B is a side view of the negative current collecting member 9. FIG. 4C is a sectional view illustrating that the axial core 11 and the negative current collecting member 9 are fitted with each other. In the figures, the negative current collecting member 9 is made of either nickel or a metal material obtained by plating copper with nickel. In the embodiment, the negative current collecting member 9 is made of a metal material obtained by plating copper with nickel. As illustrated in FIGS. 4A-4C, the negative current collecting member 9 has a disk shape, and includes a protruded portion 49 protruded at the center portion in a direction away from the axial core 11 and fitted with the other end portion 47 of the axial core 11, and a negative current collecting member body 53 located on the outer side of the protruded portion 49 to be welded to the welded portion 6 of the negative electrode. In the embodiment, the negative current collecting member body 53 constitutes the welding portion.

The negative current collecting member 9 is welded to the welded portion 6 (see FIG. 1), on the other width-direction end, of the negative electrode included in the wound electrode group 5. For welding the negative current collecting member 9 and the welded portion 6, the negative current collecting member 9 is first opposed to the welded portion 6 located on the other end of the negative electrode included in the wound electrode group 5, and is then moved toward the wound electrode group 5, and is finally placed on the welded portion 6. Thus, the welded portion 6 of the negative electrode and the negative current collecting member 9 are welded to each other by laser welding as discussed later. For laser welding, the negative current collecting member 9 is provided with eight grooves 51a to 51h that project toward the wound electrode group 5 and that open in the direction away from the wound electrode group 5. In the embodiment, the grooves 51a to 51h constitute an elongated projecting portion for welding. The grooves 51a to 51h are formed by pressing, and extend linearly radially from the protruded portion 49 of the negative current collecting member 9. The grooves 51a to 51h are formed between a protruded portion 49 and an outer periphery or a peripheral portion 55 of the negative current collecting member body 53. The grooves 51a to 51h are terminated before the outermost periphery of the negative current collecting member body 53. With this configuration, welding beads do not project beyond the outermost periphery of the negative current collecting member body 53, thereby preventing unnecessary short-circuiting due to projected welding beads.

The eight grooves 51a to 51h are formed at intervals in the circumferential direction about the protruded portion 49. In the embodiment, the grooves 51a and 51e, which are located on the extension line of a slit 57, is shorter in length than the other grooves 51b, 51c, 51d, 51f, 51g, and 51h. This structure can lengthen the slit 57.

The negative current collecting member 9 has one slit 57 formed therein to extend across the protruded portion 49 and the negative current collecting member body 53 (welding portion) and to penetrate the protruded portion 49 and the negative current collecting member body 53 in the thickness direction. The slit 57 passes through the center of the protruded portion 49, and extends entirely across the protruded portion 49 such that both ends of the slit 57 reach the negative current collecting member body 53. An electrolyte is spread through the slit 57 inside the container when the electrolyte is poured through the axial core 11. Therefore, the electrolyte is infiltrated into the wound electrode group 5 faster than conventionally. In the embodiment, the slit 57 extends to the negative current collecting member body 53. Therefore, the electrolyte, which is filled from the bottom portion side of the container, passes through the slit 57, which extends to the negative current collecting member body 53, to be directly infiltrated into the wound electrode group 5.

The number of slits 57 is arbitrary. In consideration of the strength of the protruded portion 49, however, it is sufficient to provide only one slit that passes through the center of the protruded portion 49 and extends entirely across the protruded portion 49 such that both ends of the slit reach the negative current collecting member body 53 as in the embodiment.

In the embodiment, a pair of recessed portions 63 are formed at the end portion 47 of the axial core 11 to penetrate the axial core 11 in the radial direction of the axial core 11, open toward the protruded portion 49, and oppose each other in the radial direction. The pair of recessed portions 63 coincide with the slit 57 when the end portion 47 of the axial core 11 is fitted with the protruded portion 49. This allows the electrolyte to flow smoothly through the axial core 11. Circular gas discharge holes 59 are formed in the negative current collecting member body 53 at positions between the adjacent grooves 51.

In the embodiment, the negative current collecting member body 53 is formed to be larger than the positive current collecting member body 37. Consequently, the number of welding points between the welded portion of the negative electrode and the negative current collecting member 9 is larger than the number of welding points between the welded portion of the positive electrode and the positive current collecting member 7. This enhances the performance of the capacitor 1.

<Insulating Ring Member>

Figure 5A:
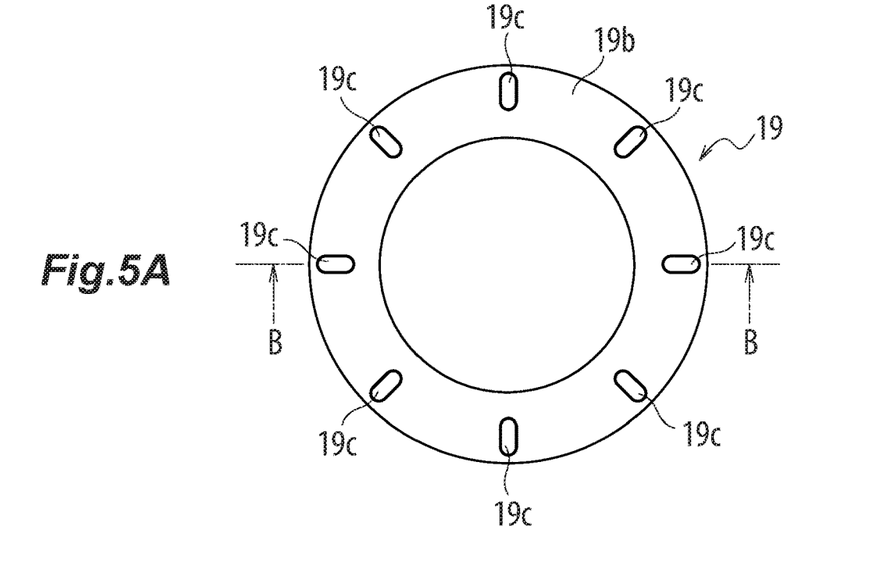
FIG. 5A is a plan view of an insulating ring member used in the embodiment of the present invention.
Figure 5B:
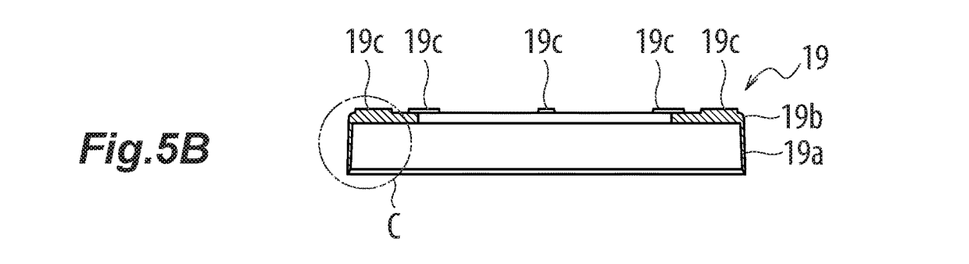
FIG. 5B is a sectional view taken along line B-B of FIG. 5A.
Figure 5C:
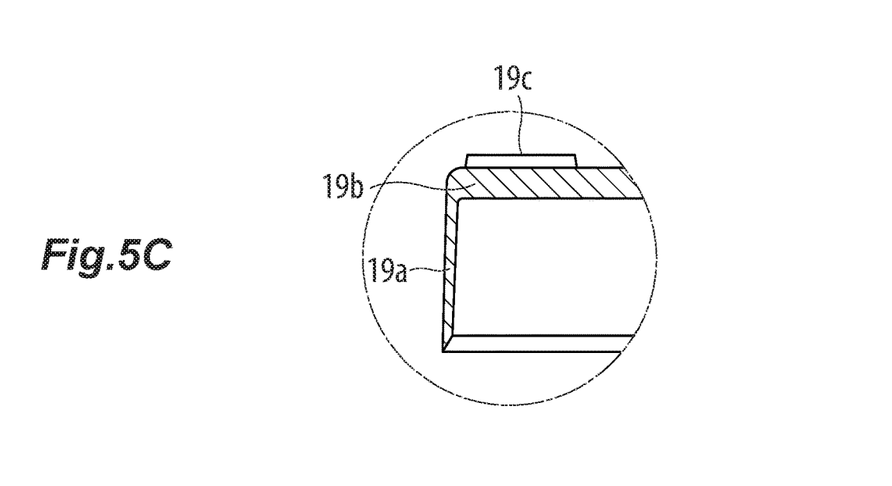
FIG. 5C is an enlarged view of the C portion of FIG. 5B.

As illustrated in FIGS. 5A to 5C, the insulating ring member 19 includes a cylindrical portion 19a surrounding the outer periphery of an end portion of the wound electrode group 5 on the side of the positive current collecting member 7, and a plate-like portion 19b integrally formed with the cylindrical portion 19a and extending inward in the radial direction from the cylindrical portion 19a to contact the positive current collecting member 7. Eight projections 19c are integrally provided on a surface of the plate-like portion 19b, which opposes the annular projected portion 15, to contact the annular projected portion 15. The eight projections 19c are disposed at constant intervals in the circumferential direction of the axial core 11. The projections 19c are each shaped to extend in the radial direction of the axial core 11, and each have a length to project inwardly of the top portion 15a of the annular projected portion 15 in the radial direction of the axial core 11, being in contact with the annular projected portion 15. Disposing the projections 19c at constant intervals in the circumferential direction allows intensive application of pressure onto the plurality of projections 19c when the container 3 is subjected to drawing to form the annular projected portion 15. Therefore, substantially equal pressing forces are applied to the insulating ring member 19 from the plurality of projections 19c which are disposed at constant intervals. As a result, application of the substantially uniform pressing forces to the electrode group unit 2 prevents non-uniform deformation of the wound electrode group 5. This, in turn, can enhance resistance against vibration applied to the capacitor 1 in the axial direction of the axial core 11. In a configuration where the projections 19c each have a length to project inwardly of the top portion 15a of the annular projected portion 15 in the radial direction of the axial core 11, the surface areas of the projections 19c in contact with the annular projected portion 15 are substantially equal to each other at all times. As a result, fluctuations in pressing force applied to the electrode group unit 2 via the projections 19c can be minimized.

Figure 6A:
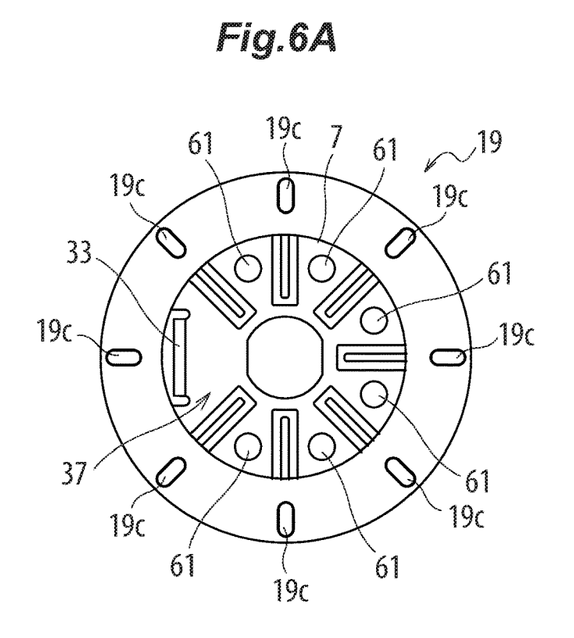
FIG. 6A is a plan view illustrating that the insulating ring member is mounted to the positive current collecting member.
Figure 6B:
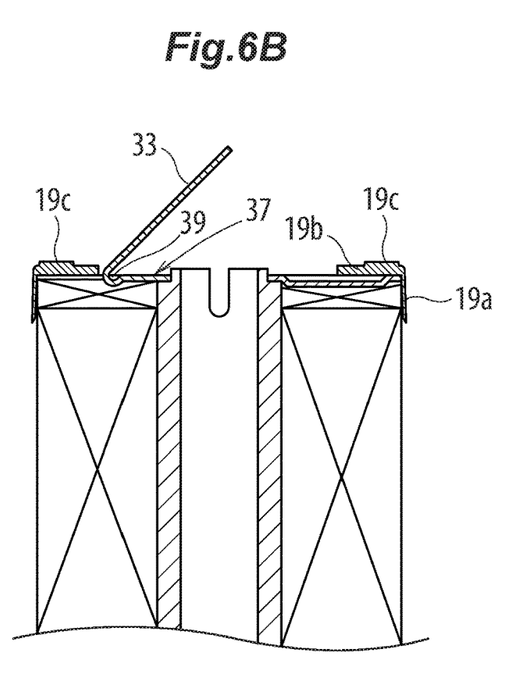
FIG. 6B is a partially enlarged view illustrating that the insulating ring member is mounted to the positive current collecting member.

FIGS. 6A and 6B are a plan view and a partial sectional view, respectively, illustrating that the insulating ring member 19 is mounted to the positive current collecting member 7. In FIG. 6A, the tab 33 is illustrated as extending vertically upright. In order to fully demonstrate the gas discharge function, the plate-like portion 19b is preferably sized not to block the gas discharge holes 61 of the positive current collecting member 7 as illustrated in FIG. 6A.

<Welding Between Wound Electrode Group and Current Collecting Members>

Laser light is used to weld the welded portions of the wound electrode group 5 and the current collecting members (positive current collecting member 7 and negative current collecting member 9) to each other. In the embodiment, a direct-collecting semiconductor laser device (DLL, not illustrated) that continuously generates laser light is used as a laser welding device. Welding of the positive current collecting member 7 will be described as an example. The positive current collecting member 7 is locally melted by continuously applying laser light generated by the direct-collecting semiconductor laser device along the grooves 29 of the positive current collecting member 7 from the center portion toward the outer periphery of the positive current collecting member 7, in order to weld the welded portion 4 of the positive electrode and the positive current collecting member 7 to each other with a molten metal. Performing laser welding using the direct-collecting semiconductor laser device as in the embodiment allows the positive current collecting member to be efficiently melted, enables reliable welding, and reliably prevents an increase in resistance of the welded portion. Use of a fiber-guided semiconductor laser device or the like in place of the direct-collecting semiconductor laser device also achieves good welding results.

The negative current collecting member 9 and the welded portion 6 of the negative electrode are also welded to each other in the same manner. That is, the negative current collecting member 9 is melted to weld the welded portion of the negative electrode and the negative current collecting member 9 to each other with a molten metal.

<Placement of Wound Electrode Group into Container>

As illustrated in FIG. 1, the electrode group unit 2, which includes the wound electrode group 5 to which the current collecting members 7 and 9 have been welded, is contained in the container 3. With the electrode group unit 2 contained in the container 3, the protruded portion 49 of the negative current collecting member 9 and the bottom portion (protruded portion 23) of the container 3 are welded by spot welding using an electrode for welding inserted into the axial core 11 for electrical connection between the negative current collecting member 9 and the container 3.

The insulating ring member 19 is attached to the outer peripheral edge of the positive current collecting member 7 for electrical insulation between the positive current collecting member 7 and the container 3. A part of the container 3 is subjected to drawing in the vicinity of the opening portion to form the annular projected portion 15. Thus, the electrode group unit 2 is fixed in the container 3 as illustrated in FIG. 1.

As illustrated in FIG. 1, the lid member 31 forming a positive electrode terminal is disposed above the positive current collecting member 7. The lid member 31 is composed of a lid body 31A made of aluminum, and a lid cap 31B made of steel plated with nickel as with the container 3. As illustrated in FIG. 2, one end of a tab 32 in an elongated plate shape is welded to the lid body 31A, and a fold-back portion 32A is formed at the other end of the tab 32. A free end portion of the tab 33 of the positive current collecting member 7 is welded to the fold-back portion 32A. Consequently, the lid member 31 is electrically connected to the positive current collecting member 7 of the wound electrode group 5.

The lid member 31 is disposed on the annular projected portion 15 formed on the container 3 via an electrically insulating member 65 for electrical insulation between the lid member 31 and the container 3. The electrically insulating member 65 is made of an elastic insulating material such as rubber, for example, and is shaped to surround the entire outer periphery of the lid body 31A of the lid member 31. An annular wall portion 67 located on the side of the opening portion of the container 3 with respect to the annular projected portion 15 is curled (crimpled) toward the lid member 31. As a result, the lid member 31 is fixed between the annular wall portion 67 which has been curled and the annular projected portion 15 via the electrically insulating member 65. This enables tight sealing of the internal space of the capacitor 1.

An amount of a non-aqueous electrolyte (not illustrated) that is enough to infiltrate the entire electrode group unit 2 is poured into the container 3. The non-aqueous electrolyte may be a solution prepared by dissolving lithium phosphate hexafluoride ($LiPF_6$) as a lithium salt in a polycarbonate (PC) solvent.

In the embodiments described above, the positive current collecting member is electrically connected to the lid member, and the negative current collecting member is electrically connected to the bottom portion of the container. However, it is a matter of course that the negative current collecting member may be electrically connected to the lid member and the positive current collecting member may be electrically connected to the bottom portion of the container.

In the embodiment described above, the present invention is applied to a cylindrical lithium ion capacitor. However, it is a matter of course that the present invention may also be applied to other non-aqueous electrolyte electrical storage devices such as lithium ion batteries.

An insulating ring member may be provided between a bottom portion of the container and the negative current collecting member in order to fix the negative current collecting member. The insulating ring member includes a cylindrical portion and a plate-like portion. The cylindrical portion surrounds an outer periphery of an end portion of the wound electrode group on the side of the negative current collecting member. The plate-like portion is integrally formed with the cylindrical portion, and extends inward in the radial direction from the cylindrical portion to contact the negative current collecting member. A plurality of projections are integrally provided on a surface of the plate-like portion, which opposes the bottom portion, to contact the bottom portion of the container. The plurality of projections are disposed at constant intervals in the circumferential direction of the axial core. With such a configuration, the electrode group unit is fixed on the bottom portion side in the container at an increased number of locations. Therefore, the electrical storage device is more resistant to vibration in the vertical direction.

INDUSTRIAL APPLICABILITY

According to the present invention, it is possible to provide an electrical storage device that can reduce fluctuations in pressing force applied to different portions of an insulating ring member.

SIGN LISTING 1 capacitor
2 electrode group unit
3 container
5 wound electrode group
7 positive current collecting member
9 negative current collecting member
11 axial core
13 outer periphery
15 annular projected portion
17 annular wall portion
19 insulating ring member
19a cylindrical portion
19b plate-like portion
19c projection
21 annular bottom wall portion
23 protruded portion
25 outer periphery
27 through hole
29 groove
31 lid member
33 tab
37 positive current collecting member body
39 elongated projection
41 recessed portion
49 protruded portion
51 groove
53 negative current collecting member body
55 outer periphery
57 slit
59, 61 gas discharge hole
63 recessed portion
65 electrically insulating member
67 annular wall portion

The invention claimed is:

1. An electrical storage device comprising:
a wound electrode group formed by winding a stacked member around a cylindrical axial core, the stacked member being formed by stacking an electrode having one of positive and negative polarities and formed of an elongated current collector having an active material layer formed thereon such that a welded portion is left on one width-direction end of the electrode having the one of the polarities, a separator, and an electrode having the other of the polarities and formed of an elongated current collector having an active material layer formed thereon such that a welded portion is left on the other width-direction end of the electrode having the other of the polarities;
an electrically conductive bottomed cylindrical container having an opening portion at one end thereof and configured to contain the wound electrode group therein;
an electrically conductive lid member electrically insulated from the container and configured to block the opening portion of the container;
a first current collecting member supported by one end of the axial core and welded to the welded portion of the electrode having the one of the polarities and included in the wound electrode group;
a second current collecting member supported by the other end of the axial core and welded to the welded portion of the electrode having the other of the polarities and included in the wound electrode group;
an annular projected portion formed by deforming a peripheral wall portion of a peripheral wall of the container to be projected inward in a radial direction of the axial core, the peripheral wall portion being more adjacent to the lid member than to the second current collecting member; and
an insulating ring member disposed between the annular projected portion and the second current collecting member to electrically insulate the second current collecting member and the container from each other, wherein:
the first current collecting member is electrically connected to the container;
the second current collecting member is electrically connected to the lid member;
the insulating ring member includes:
a cylindrical portion surrounding an outer periphery of an end portion of the wound electrode group on a side of the second current collecting member, and
a plate-like portion integrally formed with the cylindrical portion and extending inward in the radial direction from the cylindrical portion to contact the second current collecting member;
a plurality of projections are integrally provided on a surface of the plate-like portion, which opposes the annular projected portion, to contact the annular projected portion, the plurality of projections being disposed at constant intervals in a circumferential direction of the axial core;
the plurality of projections are each shaped to extend in the radial direction of the axial core; and
the plurality of projections each have a length to project inwardly of the annular projected portion in the radial direction, being in contract with the annular projected portion.

2. The electrical storage device according to claim 1, wherein
the plurality of projections include three or more projections.

3. The electrical storage device according to claim 1, wherein
a plurality of through holes for gas discharge are formed in the second current collecting member, and the plate-like portion of the insulating ring member is sized not to block the plurality of through holes.

4. The electrical storage device according to claim 1, wherein the plurality of projections each have a height extending toward the annular projected portion, and the length is greater than the height.

* * * * *